March 18, 1947.  J. F. LE VAN  2,417,654

JOINT FOR TUBES, RODS, AND THE LIKE

Filed May 4, 1945

INVENTOR:
John F. LeVan,
BY Bodell & Thompson
ATTORNEYS.

Patented Mar. 18, 1947

2,417,654

UNITED STATES PATENT OFFICE 2,417,654

JOINT FOR TUBES, RODS, AND THE LIKE

John F. Le Van, Elkhart, Ind., assignor to Excel Corporation, Elkhart, Ind., a corporation of Indiana Application May 4, 1945, Serial No. 592,042

2 Claims. (Cl. 287—54)

This invention relates to joints for coupling rods or tubes, as for instance, the horizontal and upright hand rails in buses and the like, and has for its object a locking or fastening member, which is readily operated to secure and tighten the rods or tubes in a coupling or fitting with no exposed projections on which gloves, finger rings, clothing, etc. of the persons or standees taking hold of the rails may snag, and it further has for its object a joint or coupling, which is particularly economical in construction and easily operable.

The invention consists in the novel features and in the combinations and constructions hereinafter set forth and claimed.

In describing this invention, reference is had to the accompanying drawings, in which like characters designate corresponding parts in all the views.

This invention includes a fitting having passages arranged at an angle to each other for receiving tubes or rods to be joined together, the fitting being formed with an internal recess in the outer angle between two of the angular passages, the recess opening into both passages, a wedge member in the recess and operable to engage both the rods or tubes in said angular passages, and thus hold them from turning and other movement, and also means operable from the outside of the recess for operating the wedge.

1 designates the fitting, which is here shown as a T fitting for receiving a horizontal rail 2 which extends through the head of the T formation and an upright rail or stanchion 3 which extends into the leg of the T formation. These rails are usually tubular and thin walled. They are usually the hand rails for standees in buses and other vehicles. The uprights or stanchions are located near the entrances and exits of the bus, and if desired at points along the length of the horizontal rails. The fitting is formed with a boss 4 in one of the angles between the head and leg of the T formation, this boss being provided with an internal recess 5 opening into the bores of the head and of the leg of the T formation.

6 designates the locking or fastening member, as a wedge, located in the recess 5 and movable to impinge and tighten against both the tube extending into the leg and the tube extending through the head of the T formation.

Figure 1:
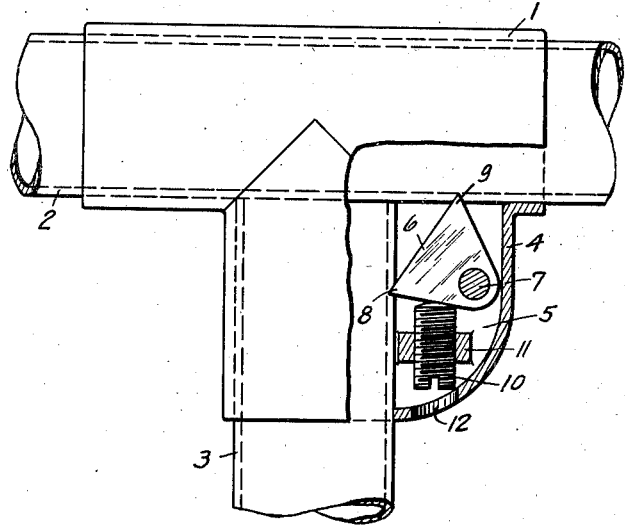
Figures 1 and 2 are, respectively, side and end elevations, partly broken away, of this joint, the contiguous portions of the tubes coupled thereby being also shown.

In Figure 1, the fastening member 6 is a wedge shown as pivoted at 7 to the walls of the recess and having edges or corners 8, 9 which, when the wedge 6 is shifted in one direction, as upward, impinge or bite into the tube 3 extending into the leg of the T formation and the tube 2 extending through the head of the T formation respectively and snugly grip and hold them in the fitting. The pivot 7 and corners or edges 8, 9 are located at the angles of a triangle.

The wedge is operated by means of a screw 10 threading into a reinforcing insert 11 in the recess and thrusting against the wedge. The screw is located entirely within the recess 5 and is accessible through a work hole 12 in the lower wall of the boss, so that the screw does not project beyond the surface of the boss. Also, the pivot pin 7 is rounded off or located flush with the surface of the boss, to avoid projections on which gloves, finger rings, etc. may snag.

Figure 2:
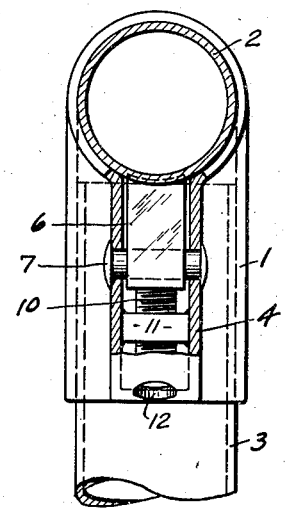
Figure 3:
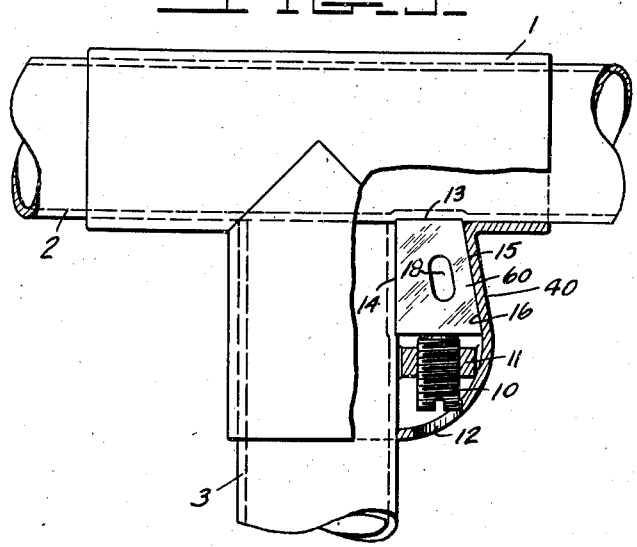
Figures 3 and 4 are views similar to Figures 1 and 2 of a modified form of the joint.
Figure 4:
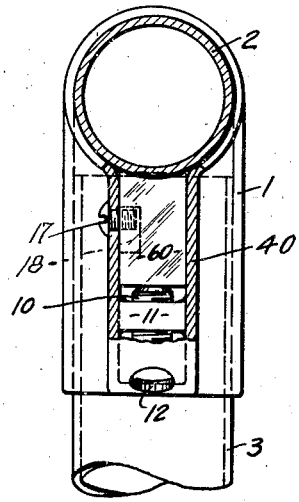

In Figure 3, the wedge 60 is shown as a sliding one, operated by a screw, the point 13 of the wedge being arranged to engage the tube 2 extending through the head of the T formation and the side 14 being arranged to clamp against the tube 3 in the leg of the T formation, this sliding wedge being moved laterally against the tube 3 in the leg of the T formation, by the action of a wedge face 15 acting inclined-plane fashion on an inclined plane face 16 on the inner wall of the boss 40, corresponding to the boss 4 (Figure 2), while the wedge is moving up to carry its point or corner 13 into the tube 1. Preferably, the corners 8, 9 and 13 are provided with cutting edges, as seen in Figure 2 curved to conform to the curvature of the tube. The sliding wedge 60 is held from displacement out of the recess 5 into the head or leg of the T formation before the tubes are assembled therein by suitable means, as a screw 17, extending through a wall of the boss 40 into a slot or groove 18 in the wedge.

What I claim is:

1. A joint for tubes, rods and the like, including a fitting having tubular passages arranged at an angle to each other for receiving the tubes or rods to be joined, and also having an internal recess opening into said passages, a wedge member in the recess and movable to contact both tubes or rods upon the same operation, and means for operating the wedge.

2. A joint for tubes, rods and the like, including a fitting having tubular passages arranged at an angle to each other for receiving the tubes or rods to be joined, and also having an internal recess opening into said passages, a wedge member in the recess, the wedge being pivoted in the recess and having corners for engaging the tubes or rods, the corners and the pivot being arranged in triangular relation, and means for moving the wedge member about its pivot and causing said corners to press into both tubes or rods.

JOHN F. LE VAN.

REFERENCES CITED

The following references are of record in the file of this patent:

UNITED STATES PATENTS

| Number | Name | Date |
|---|---|---|
| 2,384,020 | Farson | Sept. 4, 1945 |
| 1,326,182 | Cater | Dec. 30, 1919 |

FOREIGN PATENTS

| Number | Country | Date |
|---|---|---|
| 511,190 | British | Aug. 15, 1939 |